United States Patent
Bolthouse et al.

(10) Patent No.: US 11,267,453 B1
(45) Date of Patent: Mar. 8, 2022

(54) HYBRID VEHICLE ENERGY MANAGEMENT TORQUE CONTROL DURING TRANSITIONS BETWEEN TRANSIENT AND STEADY-STATE OPERATION

(71) Applicant: Ford Global Technologies, LLC, Dearborn, MI (US)

(72) Inventors: Alec Bolthouse, Dearborn, MI (US); Karthik Pillutla, Detroit, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/129,692

(22) Filed: Dec. 21, 2020

(51) Int. Cl.
| | |
|---|---|
| *B60W 20/15* | (2016.01) |
| *B60W 10/06* | (2006.01) |
| *B60W 10/08* | (2006.01) |
| *B60K 6/442* | (2007.10) |
| *B60K 6/547* | (2007.10) |
| *B60K 6/387* | (2007.10) |

(52) U.S. Cl.
CPC ............ *B60W 20/15* (2016.01); *B60K 6/442* (2013.01); *B60W 10/06* (2013.01); *B60W 10/08* (2013.01); *B60K 6/387* (2013.01); *B60K 6/547* (2013.01); *B60W 2510/0283* (2013.01); *B60W 2510/0638* (2013.01); *B60W 2510/244* (2013.01); *B60W 2540/10* (2013.01); *B60W 2710/0666* (2013.01); *B60W 2710/083* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 7,347,803 | B2 * | 3/2008 | Kobayashi | ............ B60W 10/08 |
| | | | | 477/5 |
| 7,472,769 | B2 * | 1/2009 | Yamanaka | .......... B60L 15/2045 |
| | | | | 180/65.25 |
| 7,518,530 | B2 | 4/2009 | Ohno et al. | |
| 7,892,139 | B2 * | 2/2011 | Kaltenbach | ............ B60K 6/387 |
| | | | | 477/5 |

(Continued)

FOREIGN PATENT DOCUMENTS

| | | | | |
|---|---|---|---|---|
| DE | 102013208021 | A1 * | 11/2013 | ............ B60W 20/10 |
| DE | 102008046405 | B4 * | 4/2016 | ............. B60K 6/485 |

(Continued)

*Primary Examiner* — Dirk Wright
(74) *Attorney, Agent, or Firm* — Brooks Kushman PC; David Kelley

(57) ABSTRACT

A system and method for controlling a hybrid vehicle having an engine, a traction motor, and an automatic step-ratio transmission having a plurality of selectable discrete gear ratios include operating the electric machine to provide output torque associated with a first operating point selected based on driver demand torque and a current powertrain speed during transient operation, operating the electric machine to provide an output torque associated with a second operating point selected based on the driver demand torque and the current powertrain speed during steady state operation, and controlling the engine torque based on a difference between the driver demand torque and the electric machine torque.

20 Claims, 3 Drawing Sheets

(56) References Cited

U.S. PATENT DOCUMENTS

| | | | |
|---|---|---|---|
| 8,473,133 B2 | 6/2013 | Wang et al. | |
| 8,651,998 B2 * | 2/2014 | Schenk | B60W 20/00 |
| | | | 477/5 |
| 9,061,681 B2 * | 6/2015 | Yoshida | B60L 50/16 |
| 10,422,277 B2 * | 9/2019 | Naumanen | B60W 10/26 |
| 2013/0297125 A1 * | 11/2013 | Syed | B60W 20/40 |
| | | | 701/22 |
| 2015/0032308 A1 | 7/2015 | Johri et al. | |
| 2020/0298821 A1 * | 9/2020 | Oh | B60K 6/442 |
| 2021/0188242 A1 * | 6/2021 | Pan | B60W 20/13 |
| 2021/0213931 A1 * | 7/2021 | Sasaki | B60W 20/10 |
| 2021/0237713 A1 * | 8/2021 | Tabata | B60W 10/04 |

FOREIGN PATENT DOCUMENTS

| | | | | |
|---|---|---|---|---|
| DE | 102019219041 A1 * | 6/2020 | | B60W 30/18172 |
| WO | WO-2010119498 A1 * | 10/2010 | | B60W 30/1882 |

* cited by examiner

HYBRID VEHICLE ENERGY MANAGEMENT TORQUE CONTROL DURING TRANSITIONS BETWEEN TRANSIENT AND STEADY-STATE OPERATION

TECHNICAL FIELD

This disclosure relates to control of a hybrid vehicle engine and electric machine during transitions between transient and steady-state operation.

BACKGROUND

Various hybrid vehicle powertrains may include an internal combustion engine selectively coupled to an electric machine powered by a high voltage traction battery such that the vehicle may be propelled by the engine, electric machine, or both. A disconnect clutch may be utilized to allow the engine to be decoupled from the electric machine and other downstream powertrain components to be shut-down independently of vehicle operation. A torque converter positioned between the electric machine and a step-ratio transmission gearbox has various functions including torsional isolation, torque multiplication, and a lockup clutch, which may operate as a launch clutch in some applications. During driving operation, the powertrain controller attempts to utilize the powertrain system at its most efficient operating point. This is done by adding or subtracting electric machine torque from the engine torque so that the engine, battery, and electric machine operate efficiently together while overall crankshaft torque matches the torque requested by the driver. The requested electric machine torque can be referred to as energy management (EM) torque. If EM torque is positive, the high voltage traction battery will supply the energy. If EM torque is negative, the energy will be stored in the high voltage traction battery.

The magnitude and duration of EM torque is limited by the power capability and state of charge (SOC) of the high voltage battery. As such, the most efficient operating point for the system is influenced by the duration for which the battery can maintain the requested EM torque for a particular powertrain speed and driver requested torque. For example, if the most efficient operating point is one that charges the high voltage battery aggressively, but the SOC is close to its maximum limit, then the subsequent powertrain operating point after reaching maximum SOC may be significantly less efficient than the initial point selected. This may result in frequently changing operating points leading to overall inefficient use of battery power and fuel over the duration of a driving maneuver or drive cycle.

SUMMARY

Embodiments include a vehicle comprising an engine, an electric machine selectively coupled by a first clutch to the engine, a traction battery electrically coupled to the electric machine, a step-ratio transmission selectively coupled by a second clutch to the electric machine, and a controller programmed to: operate the electric machine to provide output torque associated with a first operating point selected based on driver demand torque and a current powertrain speed during transient operation; operate the electric machine to provide an output torque associated with a second operating point selected based on the driver demand torque and the current powertrain speed during steady state operation; and control the engine torque based on a difference between the driver demand torque and the electric machine torque. The controller may be programmed to retrieve the first operating point from a transient operating mode lookup table and to retrieve the second operating point from a steady state operating mode lookup table. The controller may be further programmed to control a transition between the first operating point and the second operating point based on a first calibratable rate limit and to control a transition between the second operating point and the first operating point based on a second calibratable rate limit. The transient operating mode lookup table may be calibrated to minimize instantaneous system losses and the steady state operating mode lookup table may be calibrated to minimize energy losses based on a state of charge of the traction battery. The controller may be further programmed to detect steady state operation based on a difference between the current powertrain speed and a first rolling average of the powertrain speed being less than an associated threshold for a predetermined time, and a difference between the driver demand torque and a second rolling average of driver demand torque being less than an associated threshold for the predetermined time. The step-ratio transmission may include a torque converter having a bypass clutch wherein the second clutch comprises the bypass clutch. The current powertrain speed may be the torque converter impeller speed.

One or more embodiments include a system comprising an electric machine selectively coupled to an engine and a controller configured to control torque of the electric machine to a first torque setpoint based on driver demand torque and powertrain speed changing less than an associated threshold for a predetermined time, and control torque of the electric machine to a second torque setpoint otherwise. The controller may be configured to retrieve the first torque setpoint from a steady state operation lookup table and to retrieve the second torque setpoint from a transient operation lookup table. The controller may be configured to transition between the first torque setpoint and the second torque setpoint based on a first calibratable transition rate, and to transition between the second torque setpoint to the first torque setpoint based on a second calibratable transition rate. The controller may be further configured to control the engine torque to provide a difference between the driver demand torque and the electric machine torque. The system may include an automatic step-ratio transmission having a finite number of selectable discrete gear ratios and a torque converter, wherein the powertrain speed comprises a torque converter impeller speed.

Embodiments include a method for controlling a vehicle having an engine, an electric machine coupled to a traction battery, and a step-ratio transmission with a torque converter coupled to the electric machine. The method includes, by a vehicle controller, controlling the electric machine to a first torque operating point when operating in a transient mode and a second torque operating point when operating a steady state mode, and controlling the engine torque based on a difference between a driver demand torque and the electric machine torque, wherein the first and second operating points are selected based on the driver demand and a powertrain speed. The powertrain speed may be the impeller speed of the torque converter. The method may further include retrieving the first torque operating point from a first lookup table and retrieving the second torque operating point from a second lookup table. The first lookup table may be calibrated to minimize instantaneous system losses and the second lookup table may be calibrated to minimize energy losses based on a state of charge of the traction battery. The method may further include detecting steady state operation in response to the driver demand torque and powertrain speed changing less than associated respective thresholds for a calibratable period of time.

Embodiments according to this disclosure may provide associated advantages. For example, this disclosure provides a system and method for controlling transitions between transient and steady state operation that permits the system to be calibrated to perform efficiently during transient maneuvers by minimizing instantaneous system losses as well as detect steady state driving and respond accordingly by shifting to a table calibrated to maximize the utility of the charge capacity of the battery.

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure could be desired for particular applications or implementations.

As described in greater detail below with respect to FIGS. 1-3, embodiments of this disclosure detect steady state powertrain operation and modify the energy management (EM) torque output accordingly. This strategy may use two calibratable lookup tables based on driver requested powertrain torque and powertrain speed. A first lookup table outputs an ideal EM torque for transient maneuvers that minimizes instantaneous system losses. A second lookup table outputs an ideal EM torque to minimize long term system energy losses by considering the finite charge storage capacity of the high voltage traction battery. An algorithm is used to detect steady state operation of both driver demand and powertrain speed. When steady state operation is detected, the EM torque will transition from the transient table output to the steady state table output via a bumpless transfer or smooth transition arbitration strategy.

Previous solutions to this problem required a compromise between transient and steady state maneuvers. Embodiments according to this disclosure provide calibrations that perform efficiently during transient maneuvers by minimizing instantaneous system losses, as well as steady state calibrations that maximize the utility of the finite charge capacity of the battery when steady state driver is detected.

Figure 1:
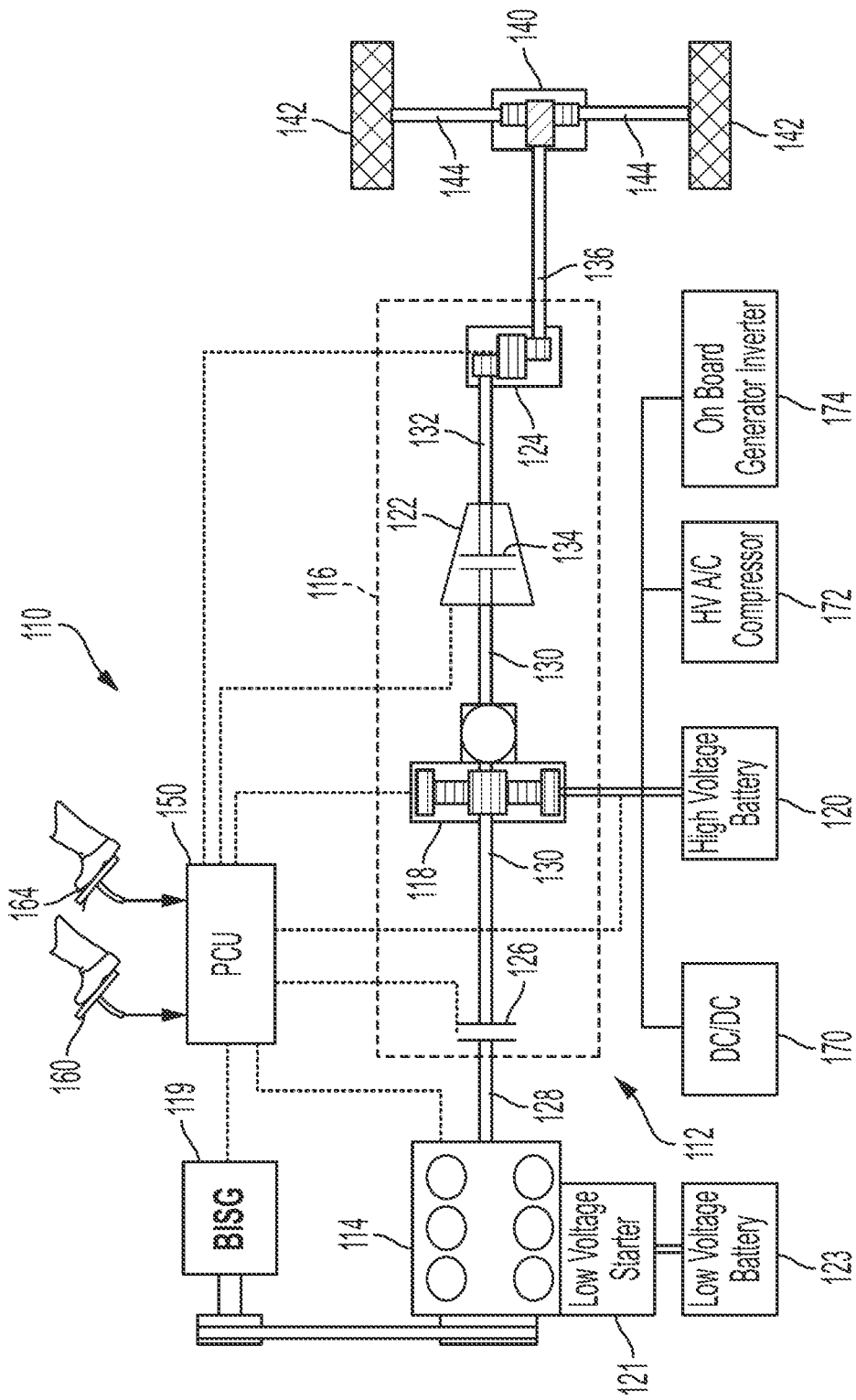
FIG. 1 is a schematic illustration of a hybrid electric vehicle with transition control between transient and steady state operation.

Referring to FIG. 1, a schematic diagram of a hybrid electric vehicle (HEV) 110 is illustrated according to an embodiment of the present disclosure. Physical placement and orientation of the components within the vehicle may vary. The HEV 110 includes a powertrain 112. The powertrain 112 includes an engine 114 that drives a transmission system 116, which may be referred to as a modular hybrid transmission (MHT) system. As will be described in further detail below, in various embodiments, transmission system 116 may include an electric machine such as an electric motor/generator (M/G) 118, an associated high voltage traction battery 120, a transmission oil/fluid pump 125, a torque converter 122, and a multiple step-ratio automatic transmission, or gearbox 124. Gearbox 124 may also be implemented by an automated mechanical transmission having one or more electric motors to select one of the multiple discrete gear ratios based on current vehicle and ambient operating conditions or modes.

In addition to M/G 118, HEV 110 may include a one or more additional electric machines, such as belt-driven integrated starter/generator (BISG) 119, which is driven by engine 114. BISG 119 may provide electric energy stored in an associated battery for use in starting engine 114, powering various vehicle electrical loads, or in some applications providing limited propulsive power to HEV 110. Engine 114 may include a low voltage starter motor 121 powered by an associated low voltage auxiliary battery 123.

The engine 114 and the electrical machine 118 are both drive sources for the vehicle 110. The engine 114 generally represents a power source that may include an internal combustion engine such as a gasoline, diesel, or natural gas powered engine, or a fuel cell. The engine 114 generates an engine power and corresponding engine torque that is supplied to the electric machine 118 when a disconnect clutch 126 (which may be referred to as an upstream clutch or first clutch) between the engine 114 and the electric machine 118 is at least partially engaged. The electric machine 118 may be implemented by any one of a plurality of types of electric machines, such as a permanent magnet synchronous motor, for example. Electric machine 118 may also be referred to as a traction motor as it can operate as an electric motor to provide torque to vehicle wheels 142. Power electronics condition direct current (DC) power provided by the traction battery 120 to the requirements of the electric machine 118. For example, power electronics may provide three phase alternating current (AC) to the electric machine 118.

HEV 110 may include a DC/DC converter that converts power from high voltage battery 120 to lower voltage power suitable for various vehicle accessories. Power from DC/DC converter 170 may be used to charge auxiliary battery 123. High voltage DC accessories may be directly powered by a corresponding high voltage bus 180 coupled to high voltage battery 120. High voltage accessories may include an air-conditioning (A/C) compressor 172 or an electric heater, for example. The high voltage bus 180 may also couple one or more inverters, such as on-board generator inverter 174, to power lower voltage AC plug-in accessories. For example, on-board generator inverter 174 may power multiple outlets having single-phase AC nominal voltages of 110/220V.

When the disconnect clutch 126 is at least partially engaged, power flow from the engine 114 to the electric machine 118 or from the electric machine to the engine 114 is possible. For example, the disconnect clutch 126 may be engaged and electric machine 118 may operate as a generator to convert rotational energy provided by a crankshaft 128 and electric machine shaft 130 into electrical energy to be stored in the traction battery 120. As described in greater detail below, electric machine 118 may operate as either a motor to increase torque provided to output shaft 136, or as a generator to decrease torque provided to output shaft 136, to allow engine 114 to operate at a desired engine speed and torque operating point to attain a particular system goal, such as fuel efficiency or to minimize instantaneous system losses or minimize long term system energy losses by considering the finite charge storage capacity of the battery depending on transient or steady state operation, respectively, for example. The disconnect clutch 126 can also be disengaged to isolate the engine 114 from the remainder of the powertrain 112 such that the electric machine 118 can act as the sole drive source for the HEV 110. Shaft 130 extends through the electric machine 118. The electric machine 118 is continuously drivably connected to the shaft 130, whereas the engine 114 is drivably connected to the shaft 130 only when the disconnect clutch 126 is at least partially engaged. When the disconnect clutch 126 is engaged, a fixed speed relationship exists between the speed of the engine 114 and the speed of the electric machine 118.

The electric machine 118 is connected to the torque converter 122 via shaft 130. The torque converter 122 is therefore connected to the engine 114 when the disconnect clutch 126 is at least partially engaged. The torque converter 122 includes an impeller fixed to electric machine shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. The impeller speed may be used as the powertrain speed for accessing one or more lookup tables for transient or steady state operation as described herein. Other rotating components may alternatively be used to determine the powertrain speed. The powertrains speed may be directly sensed or may be calculated based on one or more sensed components and related parameters.

A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch (also referred to as a downstream clutch or second clutch) to provide a smooth vehicle launch. Alternatively, or in combination, a launch clutch similar to disconnect clutch 126 may be provided between the electric machine 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch as previously described.

The gearbox 124 may include gear sets (not shown) that are selectively placed in different gear ratios by selective engagement of friction elements such as clutches and brakes (not shown) to establish the desired multiple discrete or step ratios between the input and output of the gear box 124. The friction elements are controllable through a shift schedule that connects and disconnects certain elements of the gear sets to control the ratio between an output shaft 136 and input shaft 132. The gearbox 124 is automatically shifted from one ratio to another based on various vehicle and ambient operating conditions by an associated controller, such as a powertrain control unit (PCU) 150. The gearbox 124 then provides powertrain output torque to output shaft 136. The gearbox 124 may be understood to provide a selectable fixed speed relationship between the speed of electric machine 118 and the speed of vehicle traction wheels 142.

As shown in the representative embodiment of FIG. 1, the output shaft 136 is connected to a differential 140. The differential 140 drives a pair of wheels 142 via respective axles 144 connected to the differential 140. The differential transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated powertrain control unit (PCU) 150. While illustrated as one controller, the PCU 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, controlling current to operate electric machine 118 to provide wheel torque or charge battery 120, select or schedule transmission shifts, etc. Controller 150 may include a microprocessor or central processing unit (CPU) in communication with various types of non-transitory computer readable storage devices or media. Computer readable storage devices or media may include volatile and nonvolatile or persistent storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, parameters, calibratable values, calibratable lookup tables, thresholds, transition rates etc. used by the controller in controlling the engine 114, electric machine 118, transmission gearbox 124, clutches 126, 134, or various other vehicle systems and components.

The controller communicates with various engine/vehicle sensors and actuators via an input/output (I/O) interface that may be implemented as a single integrated interface that provides various raw data or signal conditioning, processing, and/or conversion, short-circuit protection, and the like.

Alternatively, one or more dedicated hardware or firmware chips may be used to condition and process particular signals before being supplied to the CPU. As generally illustrated in the representative embodiment of FIG. 1, PCU 150 may communicate signals to and/or from engine 114, disconnect clutch 126, electric machine 118, launch clutch 134, transmission gearbox 124, DC/DC converter 170, high voltage battery 120, HV A/C compressor 172, on-board generator inverter 174, etc. Although not explicitly illustrated, those of ordinary skill in the art will recognize various functions or components that may be controlled by PCU 150 within each of the subsystems identified above. Representative examples of parameters, systems, and/or components that may be directly or indirectly actuated using control logic, code, or software algorithms executed by the controller to control engine torque or electric machine torque to an operating point as described herein include fuel injection timing, rate, and duration, throttle valve position (to control vacuum or manifold airflow for gas engine applications), spark plug ignition timing (for spark-ignition engines), intake/exhaust valve timing and duration, front-end accessory drive (FEAD) components such as an alternator, air conditioning compressor, battery charger, regenerative braking, power electronics, electric machine operation, clutch pressures for disconnect clutch 126, launch clutch 134, and transmission gearbox 124, and the like. Sensors communicating input through the I/O interface may be used to indicate turbocharger boost pressure, crankshaft position, engine rotational speed (RPM), wheel speeds (WS1, WS2), vehicle speed (VSS), engine coolant temperature (ECT), intake manifold pressure (MAP), accelerator pedal position (PPS) of an accelerator pedal 160, brake pedal position (BPS) of a brake pedal 164, ignition switch position (IGN), throttle valve position (TP), air temperature (TMP), exhaust gas oxygen (EGO) or other exhaust gas component concentration or presence, intake air flow (MAF), transmission gear selection (PRNDL), ratio, or mode, transmission oil temperature (TOT), transmission turbine speed (TS), torque converter bypass clutch 34 status (TCC), deceleration or shift mode (MDE), electric machine current or torque, electric machine temperature, accessory load, or traction battery state-of-charge, for example.

Figure 2:
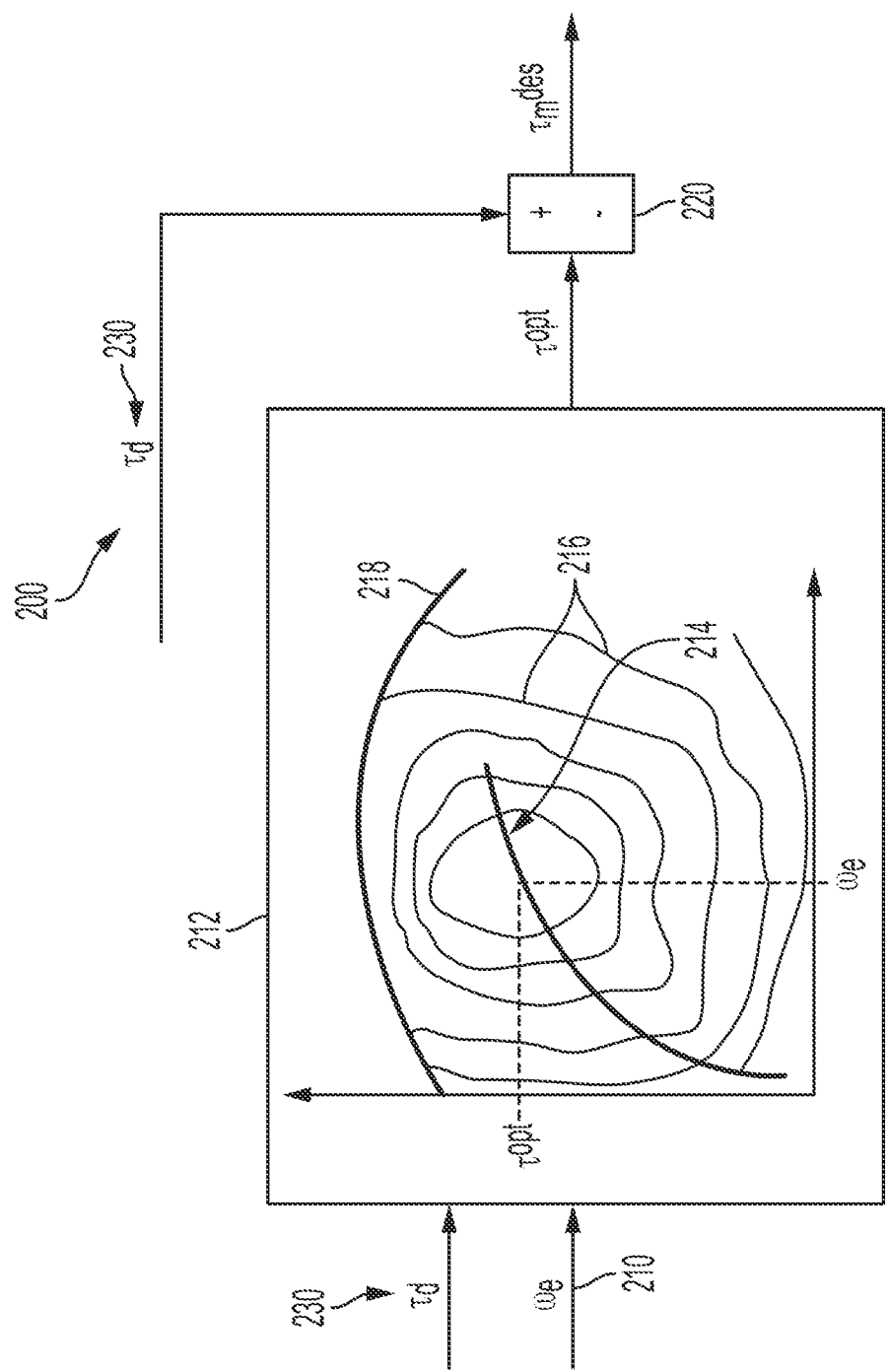
FIG. 2 illustrates a control strategy that selects an engine operating point and determines a desired energy management torque for the electric machine in response to driver demand and powertrain speed.
Figure 3:
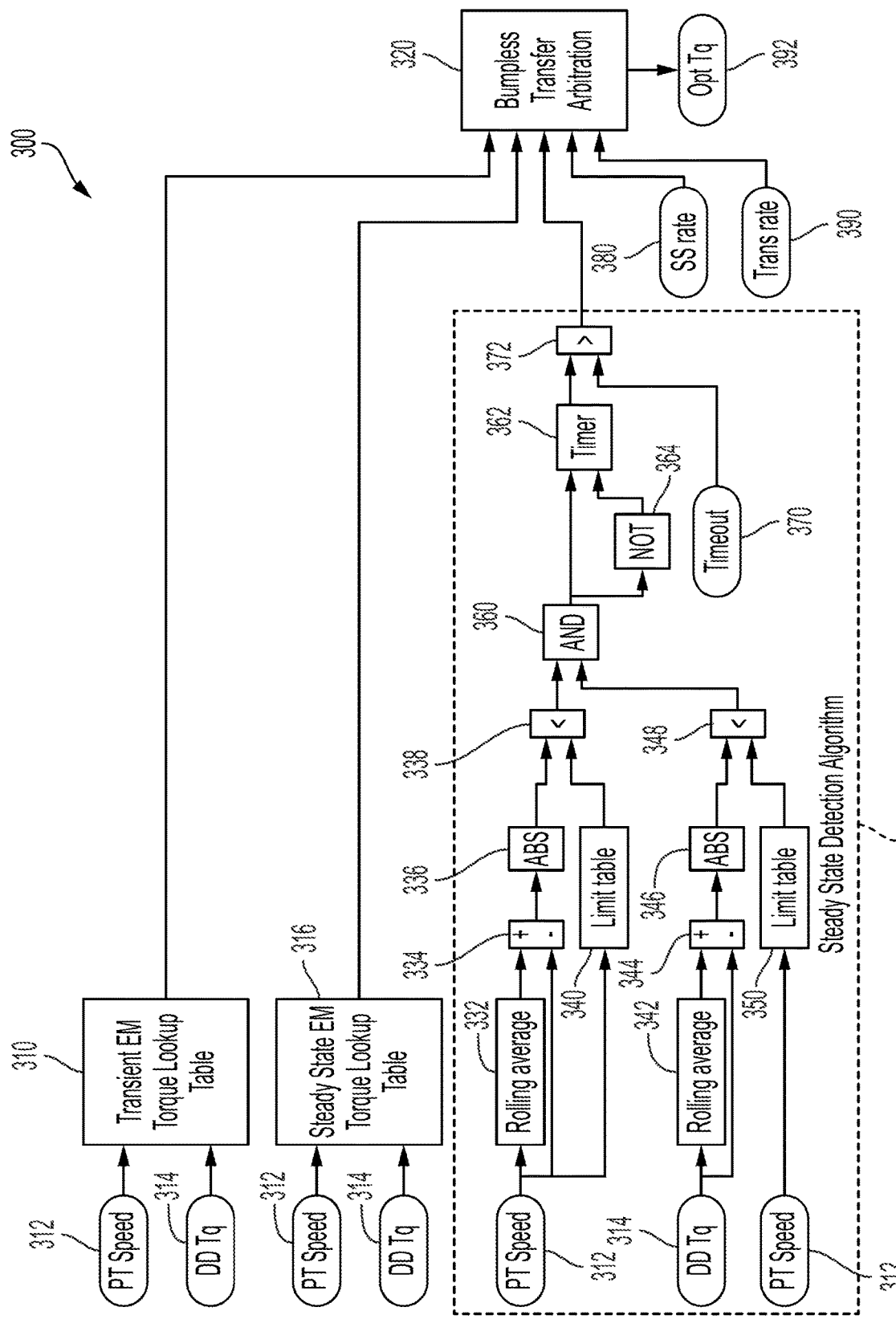
FIG. 3 is a block diagram illustrating operation of a system or method for detecting steady state operation and controlling the transition from transient to steady state EM torque control.

Control logic or functions performed by PCU 150 may be represented by flow charts or similar diagrams in one or more figures, such as the diagrams of FIGS. 2-3. These figures provide representative control strategies, algorithms, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Accelerator pedal 160 is used by the driver of the vehicle to provide a driver demanded torque, power, or drive command to propel the vehicle. In general, depressing and releasing the accelerator pedal 160 generates an accelerator pedal position signal that may be interpreted by the controller 150 as a demand for increased power or decreased power, respectively. Accelerator pedal position may also trigger regenerative braking, alone or in combination with depression of brake pedal 164. Some vehicle applications and/or operating modes may determine driver demanded torque using inputs other than the pedal 160, such as when operating in cruise control or when used in an autonomous vehicle application, for example. The controller 150 commands torque from the engine 114 and/or the electric machine 118 to provide the driver demand torque. The controller 150 also controls the timing of gear shifts within the gearbox 124 as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle with the engine 114, the disconnect clutch 126 is at least partially engaged to transfer at least a portion of the engine torque through the disconnect clutch 126 to the electric machine 118, and then from the electric machine 118 through the torque converter 122 and gearbox 124. The electric machine 118 may supplement or absorb torque produced by the engine 114 so that engine 114 may operate at or near a selected engine speed/torque operating point.

To drive the vehicle with the electric machine 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy to DC/DC converter 170, HV components, such as a heater or A/C compressor 172, and one or more inverters 174.

In any mode of operation, the electric machine 118 may act as a motor and provide a driving force for the powertrain 112. Alternatively, the electric machine 118 may act as a generator and convert kinetic energy from the powertrain 112 into electric energy to be stored in the battery 120. The electric machine 118 may act as a generator while the engine 114 is providing propulsion power for the vehicle 110, for example. The electric machine 118 may additionally act as a generator during times of regenerative braking in which rotational energy from spinning wheels 142 is transferred back through the gearbox 124 and is converted into electrical energy for storage in the battery 120.

Gearbox 124 is a step-ratio gearbox with a finite number of selectable discrete gear ratios including at least one reverse and multiple forward ratios. Electric machine 118 may share a common cooling fluid or oil with torque converter 122 and transmission gearbox 124. Electric machine 118, torque converter 122, transmission gearbox 124, and upstream clutch 126 may be positioned within a common housing. HEV 110 may include a cooling system having one or more cooling circuits that circulate a thermal exchange fluid and associated heat exchangers or radiators.

It should be understood that the schematic illustrated in FIG. 1 is merely representative and is not intended to be limiting. Other configurations are contemplated that utilize selective engagement of both an engine and a motor to transmit torque through the transmission. For example, the electric machine 118 may be offset from the crankshaft 128 and/or the electric machine may be provided between the torque converter 122 and the gearbox 124. Other configurations are contemplated without deviating from the scope of the claimed subject matter.

As generally illustrated in FIG. 1 and explained in greater detail below, in one or more embodiments, vehicle 110 includes an engine 114, an electric machine 118 selectively coupled by a first clutch 126 to the engine 114, a high voltage traction battery 120 electrically coupled to the electric machine 118, a step-ratio transmission 124 selectively coupled by a second clutch 134 to the electric machine 118, and a controller 150 programmed to operate the electric machine 118 to provide output torque associated with a first operating point selected based on driver demand torque indicated by accelerator pedal 160 and a current powertrain speed indicated by the impeller of torque converter 122 or electric machine shaft 130 during transient operation, operate the electric machine 118 to provide an output torque associated with a second operating point selected based on the driver demand torque and the current powertrain speed during steady state operation, and control the torque produced by engine 114 based on a difference between the driver demand torque and the electric machine torque. Stated differently, controller 150 may be programmed to control torque of the electric machine 118 to a first torque setpoint based on driver demand torque indicated by accelerator pedal 160, for example, and powertrain speed changing less than an associated threshold for a predetermined time, i.e. steady state operation, and control torque of the electric machine 118 to a second torque setpoint otherwise, i.e. transient operation.

Referring to FIGS. 1 and 2, control logic and a representative lookup table for controlling engine 114 and electric machine 118 is illustrated. A driver demand torque request $\tau_d$ is received as indicated at 200. The driver demand torque request $\tau_d$ 230 is equivalent to a driver power request divided by a current vehicle speed. The driver power request may correspond to position of an accelerator pedal 160, or may be generated automatically by controller 150 or another controller, such as when operating in cruise control, or when applied to an autonomous vehicle. A current engine speed ω_e is also received as indicated at 210. Engine sped may be used as a powertrain speed in some embodiments. A corresponding engine torque $\tau^{opt}$ for the current engine speed we and driver demanded torque 230 is obtained at operation 212 to achieve a desired system operating goal, such as minimizing engine fuel consumption, minimizing instantaneous or long-term battery depletion, maximizing instantaneous or long-term system efficiency, etc. Operation 212 may include retrieving a value from a lookup table stored in memory that represents a desired characteristic curve 214 calibrated to provide an engine torque $\tau^{opt}$ for the desired characteristic at a given engine speed we where the engine speed is determined based on current vehicle speed and transmission gear ratio. The desired characteristic may be, for example, peak system efficiency or lowest fuel consumption or lowest system losses, for example. The desired characteristic could also include reduced emissions, or various other characteristics, or a combination of characteristics.

For purposes of illustration, operation 212 is represented as a chart having operating zones of the engine including a plurality of system efficiency contours 216 bounded by a maximum engine torque curve 218. The desired characteristic curves and contours may be calibrated through vehicle testing, computer simulation, or other methods as appropriate. If the desired characteristic is system efficiency, the efficiency curves and contours will depend on an engine brake specific fuel consumption, motor efficiency map, battery state-of-charge (SOC), powertrain efficiency, and other factors. The operation may be embodied in one or more lookup tables, equations, algorithms, or other methods. The selected engine torque $\tau^{opt}$ to approach or achieve the desired characteristic is then provided to operation 220. At operation 220, the difference between the engine torque $\tau^{opt}$ associated with the selected engine operating point and the driver torque request $\tau_d$ is determined. The resulting difference is the desired electric machine torque as represented by $\tau_m^{des}$. The engine 114 will be commanded to provide a desired engine torque $\tau_e^{des}$ equal to $\tau^{opt}$, and the electric machine 118 will be commanded to provide a torque equal to $\tau_m^{des}$.

Commanding the engine to provide the desired engine torque may include control of various vehicle systems or actuators depending on the particular type of engine. For example, for a spark-ignited gasoline engine, the controller may control a throttle valve to control vacuum or intake manifold airflow, spark ignition timing, fuel injection metering and timing, etc. For a compression-ignition diesel engine, the controller may control fuel injection metering and timing, etc. Commanding the electric machine to provide a desired energy management torque may include controlling current supplied from the battery to the electric machine operating as a motor to increase output torque, or controlling current supplied to the battery from the electric machine operating as a generator to decrease output torque.

However, as previously described, because the traction battery is of finite size, the magnitude and duration of the electric machine or energy management torque is limited by the battery power capability and current SOC. As such, given a powertrain speed and driver requested or demand torque, the most efficient operating point for the system is influenced by the duration for which the battery can maintain the requested EM torque. For example, if the most efficient operating point is one that charges the battery aggressively, but the battery SOC is close to its maximum limit, then the subsequent powertrain operating point after reaching maximum SOC may be significantly less efficient than the initial point chosen. This can lead to a series of alternating operating points resulting in overall inefficient use of HV battery and fuel over the duration of a driving maneuver. Therefor, the selected engine operating point as described with reference to FIG. 2 may be adjusted or modified based on the battery state-of-charge (SOC) and whether the driver demand torque and powertrain speed are in transient or steady state operation.

In one or more embodiments, lookup tables similar to that represented in FIG. 2 are provided to specify an electric machine torque with a first lookup table for transient operation and a second lookup table for steady state operation as described above and illustrated and described in greater detail with respect to FIG. 3. Rather than using engine speed as an index or input parameter, the electric machine torque lookup tables select or determine a desired electric machine torque based on torque converter impeller speed and driver demand torque with the particular lookup table selected based on steady state or transient operation. The steady state lookup table is calibrated to minimize long term system energy losses by considering the finite charge storage capacity of the battery, whereas the transient operation lookup table is calibrated to minimize instantaneous system losses.

FIG. 3 is a block diagram illustrating operation of a system or method for detecting steady state operation and controlling the transition from transient to steady state EM torque control. Control strategy or logic 300 includes a transient operation lookup table 310 that outputs an electric machine torque target or desired operating point based on a current powertrain speed 312 and driver demand torque 314. Transient operation lookup table 310 may include values determined to minimize instantaneous system losses. A steady state operation lookup table 316 is accessed to retrieve or select a corresponding electric machine torque target or desired operating point based on the current powertrain speed 312 and driver demand torque 314. Steady state operation lookup table 316 may include values determined to minimize long term system energy losses by considering the finite charge storage capacity and current SOC of the traction battery. The electric machine torque retrieved from lookup tables 310, 316 is provided to a bumpless transfer arbitration strategy or function 320 that determines an optimal output torque 392 based on inputs from blocks 310, 316, 372, 380, and 390 as described in greater detail below.

Logic or algorithm 330 detects steady state operation based on driver demand torque 312 and powertrain speed 314 changing less than an associated threshold for a calibratable predetermined time period. A rolling average of the powertrain speed 312 is calculated at 332 and compared to a current instantaneous value of the powertrain speed 312 at 334. The rolling average may have a calibratable time constant that determines the number of samples or amount of time associated with the values that form the rolling average. The rolling average 332 may be a weighted average with more recent values weighted more than older values depending on the particular application. Other statistical operations or functions may be applied to the powertrain speed values to provide an indication of a rate of change or magnitude of change over a predetermined time period. The absolute value of the difference 334 between the rolling average 332 and current powertrain speed 312 is determined at 336 and compared at 338 to an associated calibratable threshold or limit 340. Steady state powertrain speed is indicated when the difference between the current value of powertrain speed 312 and the rolling average 332 is less than the threshold 340 with an output trigger or flag from block 338 provided to block 360.

A rolling average of the driver demand torque 314 is calculated at 342 and compared to a current instantaneous value of the driver demand torque at 344. The rolling average may have a calibratable time constant that determines the number of samples or amount of time associated with the values that form the rolling average. The rolling average 342 may be a weighted average with more recent values weighted more than older values depending on the particular application. Other statistical operations or functions may be applied to the driver demand torque values to provide an indication of a rate of change or magnitude of change over a predetermined time period. The absolute value of the difference 344 between the rolling average 342 and current driver demanded torque 314 is determined at 346 and compared at 348 to an associated calibratable threshold or limit 350. Steady state driver demanded torque is indicated when the difference 344 between the current value of driver demanded torque 314 and the rolling average 342 is less than the associated limit or threshold 350 with an output trigger or flag from block 348 provided to block 360.

When powertrain speed and driver demanded torque are both steady state as detected at block 360, timer 362 (or a counter) is incremented. Timer 362 is reset or reinitialized by NOT input 364 when either powertrain speed or driver demand torque is not steady state, i.e. transient. Timer 362 is compared to an associated timeout threshold or limit 370 at 372. When steady state timer 362 exceeds the associated calibratable steady state time limit 370, a corresponding output or flag is provided by block 372 to arbitration logic or strategy 320 indicating that steady state operation has been detected.

A calibratable steady state transition rate 380 and a calibratable transient transition rate 390 are used by bumpless transfer arbitration strategy 320 to control transitions between the electric machine torque targets selected or retrieved from transient operation lookup table 310 and steady state operation lookup table 316 in response to a change in steady state operation detected by algorithm 330. Bumpless transfer arbitration strategy 320 determines the optimal electric machine torque 392 from lookup table 310 during transient operation, from lookup table 316 during steady state operation, and a target value between the transient and steady state target values subject to the transition rates 380, 390 when transitioning between steady state and transient operation.

As generally illustrated in FIGS. 1-3, a method for controlling a vehicle 110 having an engine 114, an electric machine 118 coupled to a traction battery 120, and a step-ratio transmission 124 with a torque converter 122 coupled to the electric machine 118 includes controlling the electric machine 118 torque to a first torque operating point from lookup table 310 during transient operation as determined by steady state detection algorithm 330 and a second torque operating point from lookup table 316 during steady state operation as determined by steady state detection algorithm 330. The method also includes controlling the engine 114 torque based on a difference between a driver demand torque 314 and the electric machine 118 torque, wherein the first and second torque operating points are selected based on the driver demand 314 and a powertrain speed 312. The steady state detection algorithm 330 detects steady state operation at 360 in response to the driver demand torque 312 and powertrain speed 314 changing less than associated respective thresholds 340, 350 for a calibratable period of time 370.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, flash devices and/or other solid state storage devices. The processes, methods, or algorithms can also be implemented in a software executable object or code. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, firmware, and software components.

While representative embodiments are described above, it is not intended that these embodiments describe all possible forms encompassed by the claims. The words used in the specification are words of description rather than limitation, and it is understood that various changes can be made without departing from the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications or implementations.

What is claimed is:

1. A vehicle comprising:
an engine;
an electric machine selectively coupled by a first clutch to the engine;
a traction battery electrically coupled to the electric machine;
a step-ratio transmission selectively coupled by a second clutch to the electric machine; and
a controller programmed to:
operate the electric machine to provide output torque associated with a first operating point selected based on driver demand torque and a current powertrain speed during transient operation;
operate the electric machine to provide an output torque associated with a second operating point selected based on the driver demand torque and the current powertrain speed during steady state operation; and
control the engine torque based on a difference between the driver demand torque and the electric machine torque.

2. The vehicle of claim 1 wherein the controller is programmed to retrieve the first operating point from a transient operating mode lookup table and to retrieve the second operating point from a steady state operating mode lookup table.

3. The vehicle of claim 2 wherein the controller is further programmed to control a transition between the first operating point and the second operating point based on a first calibratable rate limit.

4. The vehicle of claim 3 wherein the controller is further programmed to control a transition between the second operating point and the first operating point based on a second calibratable rate limit.

5. The vehicle of claim 2 wherein the transient operating mode lookup table is calibrated to minimize instantaneous system losses.

6. The vehicle of claim 2 wherein the steady state operating mode lookup table is calibrated to minimize energy losses based on a state of charge of the traction battery.

7. The vehicle of claim 1 wherein the controller is further programmed to detect the steady state operation based on a difference between the current powertrain speed and a first rolling average of the powertrain speed being less than an associated threshold for a predetermined time, and a difference between the driver demand torque and a second rolling average of driver demand torque being less than an associated threshold for the predetermined time.

8. The vehicle of claim 1 wherein the step-ratio transmission comprises a torque converter having a bypass clutch and wherein the second clutch comprises the bypass clutch.

9. The vehicle of claim 8 wherein the current powertrain speed comprises torque converter impeller speed.

10. A system comprising:
an electric machine selectively coupled to an engine; and
a controller configured to:
control torque of the electric machine to a first torque setpoint based on driver demand torque and powertrain speed changing less than an associated threshold for a predetermined time; and
control torque of the electric machine to a second torque setpoint otherwise.

11. The system of claim 10 wherein the controller is configured to retrieve the first torque setpoint from a steady state operation lookup table and to retrieve the second torque setpoint from a transient operation lookup table.

12. The system of claim 11 wherein the controller is configured to transition between the first torque setpoint and the second torque setpoint based on a first calibratable transition rate, and to transition between the second torque setpoint to the first torque setpoint based on a second calibratable transition rate.

13. The system of claim 12 wherein the controller is further configured to control the engine torque to provide a difference between the driver demand torque and the electric machine torque.

14. The system of claim 13 further comprising an automatic step-ratio transmission having a finite number of selectable discrete gear ratios and a torque converter, wherein the powertrain speed comprises a torque converter impeller speed.

15. A method for controlling a vehicle having an engine, an electric machine coupled to a traction battery, and a step-ratio transmission with a torque converter coupled to the electric machine, the method comprising, by a vehicle controller:
controlling the electric machine torque to a first torque operating point during transient operation and a second torque operating point during steady state operation; and
controlling the engine torque based on a difference between a driver demand torque and the electric machine torque, wherein the first and second torque operating points are selected based on the driver demand and a powertrain speed.

16. The method of claim 15 further comprising detecting the steady state operation in response to the driver demand torque and powertrain speed changing less than associated respective thresholds for a calibratable period of time.

17. The method of claim 15 further comprising retrieving the first torque operating point from a first lookup table and retrieving the second torque operating point from a second lookup table.

18. The method of claim 17 wherein the first lookup table is calibrated to minimize instantaneous system losses.

19. The method of claim 17 wherein the second lookup table is calibrated to minimize energy losses based on a state of charge of the traction battery.

20. The method of claim 15 wherein the powertrain speed comprises impeller speed of the torque converter.

* * * * *